(12) United States Patent
Hwang et al.

(10) Patent No.: US 11,048,807 B2
(45) Date of Patent: Jun. 29, 2021

(54) PROTECTING DATA SECURITY WITH HIERARCHICAL AUTHORIZATION ANALYSIS

(71) Applicant: International Business Machines Corporation, Armonk, NY (US)

(72) Inventors: Jinho Hwang, Ossining, NY (US); Larisa Shwartz, Greenwich, CT (US); Victoria Lee Guerra, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 304 days.

(21) Appl. No.: 16/128,901

(22) Filed: Sep. 12, 2018

(65) Prior Publication Data

US 2020/0082104 A1   Mar. 12, 2020

(51) Int. Cl.
*G06F 21/00* (2013.01)
*G06F 21/60* (2013.01)
*G06N 20/00* (2019.01)

(52) U.S. Cl.
CPC ........... *G06F 21/604* (2013.01); *G06N 20/00* (2019.01); *G06F 2221/2101* (2013.01)

(58) Field of Classification Search
CPC .......... G06F 21/604; G06F 2221/2101; G06N 20/00
USPC .......................................................... 726/26
See application file for complete search history.

(56) References Cited

U.S. PATENT DOCUMENTS

| | | | |
|---|---|---|---|
| 5,721,904 A | 2/1998 | Ito et al. | |
| 6,212,511 B1 | 4/2001 | Fisher et al. | |
| 7,406,603 B1 | 7/2008 | MacKay et al. | |
| 7,630,974 B2 | 12/2009 | Remahl et al. | |
| 7,689,597 B1 | 3/2010 | Bingham et al. | |
| 10,430,721 B2* | 10/2019 | Yu | G06F 21/316 |
| 10,509,695 B1* | 12/2019 | Averbuch | G06F 11/0787 |
| 10,601,848 B1* | 3/2020 | Jeyaraman | H04L 63/145 |
| 2005/0097149 A1* | 5/2005 | Vaitzblit | G06F 21/6227 |
| 2008/0271122 A1* | 10/2008 | Nolan | G06F 21/32 726/4 |
| 2010/0030737 A1 | 2/2010 | Scheuber-Heinz et al. | |

(Continued)

FOREIGN PATENT DOCUMENTS

JP        2004070674 A        3/2004

OTHER PUBLICATIONS

Duan, et al., "Automated Policy Combination for Secure Data Sharing in Cross-Organizational Collaborations," vol. 4, IEEE, 2016, 15 pages.

(Continued)

*Primary Examiner* — Shin-Hon (Eric) Chen
(74) *Attorney, Agent, or Firm* — Amin, Turocy & Watson, LLP

(57) ABSTRACT

Systems, computer-implemented methods and/or computer program products that facilitate protecting data security through hierarchical authorization analysis are provided. In one embodiment, a computer-implemented method comprises generating, by a system operatively coupled to a processor, a model by extracting properties of data transmitted from executing an application to learn repeated patterns; and performing, by the system, a fine-grained authorization audit by comparing the data with the model.

20 Claims, 12 Drawing Sheets

(56) References Cited

U.S. PATENT DOCUMENTS

| | | | |
|---|---|---|---|
| 2014/0013452 A1 | 1/2014 | Aissi et al. | |
| 2014/0344571 A1 | 11/2014 | Adam et al. | |
| 2014/0359695 A1* | 12/2014 | Chari | G06F 21/31 726/1 |
| 2015/0379429 A1* | 12/2015 | Lee | G09B 5/00 706/11 |
| 2016/0267396 A1* | 9/2016 | Gray | G06N 20/00 |
| 2017/0024572 A1 | 1/2017 | Ferraiolo et al. | |
| 2017/0373945 A1* | 12/2017 | Chrysanthakopoulos | G06F 3/0608 |
| 2018/0114016 A1* | 4/2018 | Lee | G06F 21/552 |
| 2018/0167402 A1* | 6/2018 | Scheidler | H04L 63/1416 |
| 2018/0183823 A1* | 6/2018 | Fadlil | G06F 11/00 |
| 2018/0302391 A1* | 10/2018 | Jones | H04L 63/083 |
| 2018/0316676 A1* | 11/2018 | Gilpin | H04L 9/0891 |
| 2019/0104129 A1* | 4/2019 | Iqbal | H04L 63/104 |
| 2019/0340626 A1* | 11/2019 | Benum | G06Q 30/0201 |
| 2019/0354881 A1* | 11/2019 | Rosler | H04L 63/20 |

OTHER PUBLICATIONS rd.springer.com, "Influence of Schemaless Approach on Database Authorization," IAT 2017: Advanced Technologies, Systems and Application II, 9 pages.
Roichman, et al., "Fine-grained Access Control to Web Databases," SACMAT'07, Jun. 20-22, 2007, Sophia Antipolis, France, 10 pages.
Mell, et al., "The NIST Definition of Cloud Computing," NIST Special Publication 800-145, Sep. 2011, 7 pages.

\* cited by examiner

Inputs: Labeled set $D_l$, unlabeled set $D_u$, number of steps $T$, number of examples per iteration $S$
$t = 1$;
*while* $t <= T$ *do*
   Train a multi-label SVM classifier $f$ based on training data $D_l$
   for each instance $x$ in $D_u$ do
      Predict its label vector $\hat{y}$ using the LR(loss reduction)-based prediction method
      $D^*_a = \text{argmax}_{D_a}(\sum_{i \in D_a}\sum_{i=1}^{n}((1 - \hat{y}f_i(x)) / 2))$
      constrained to $\hat{y} \in \{-1, 1\}$
      (equation for Maximum loss reduction with maximal confidence)
      Calculate the expected loss reduction with the most confident label vector $\hat{y}$,
      $\text{score}(x) = \sum_{i=1}^{n}((1 - \hat{y}f_i(x))/2)$
   Sort score(x) in decreasing order for all $x$ in $D_u$
   Select a set of $S$ examples $D^*_a$ with the largest scores (or experienced SME input),
   and update the training set $D_l \leftarrow D_l + D^*_a$
   end for
   Train the multi-label learner $l$ with $D_l$
   $t = t + 1$;
*end while*

$f_i(x)$ is a SVM classifier associated with class $i$
$x_1 ... x_n$ data points (e.g. feature vector for each $x$ — {roles, access types, data types, data, etc.})

PROTECTING DATA SECURITY WITH HIERARCHICAL AUTHORIZATION ANALYSIS

BACKGROUND

The subject disclosure relates to facilitating protecting data security, more specifically, facilitating protecting data security with hierarchical authorization analysis.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate protecting data security.

According to one embodiment, a system is provided. The system can comprise a memory that stores computer executable components. The system can also comprise a processor, operably coupled to the memory, and that can execute computer executable components stored in the memory. The computer executable components can comprise a modeling component that generates a model by extracting properties of data transmitted from executing an application to learn repeated patterns. The computer executable components can further comprise an audit component that performs a fine-grained authorization audit by comparing the data with the model.

According to another embodiment, a computer-implemented method is provided. The computer-implemented method can comprise generating, by a system operatively coupled to a processor, a model by extracting properties of data transmitted from executing an application to learn repeated patterns. The computer-implemented method can further comprise performing, by the system, a fine-grained authorization audit by comparing the data with the model.

According to another embodiment, a computer program product for facilitating protecting data security is provided. The computer program product can comprise a computer readable storage medium having program instructions embodied therewith. The program instructions can be executable by a processor to cause the processor to generate a model by extracting properties of data transmitted from executing an application to learn repeated patterns. The program instructions can further be executable by a processor to cause the processor to perform a fine-grained authorization audit by comparing the data with the model.

DESCRIPTION OF THE DRAWINGS

FIG. 9 illustrates an example, non-limiting active learning algorithm facilitating protecting data security in accordance with one or more embodiments described herein.

DETAILED DESCRIPTION

Figure 1:
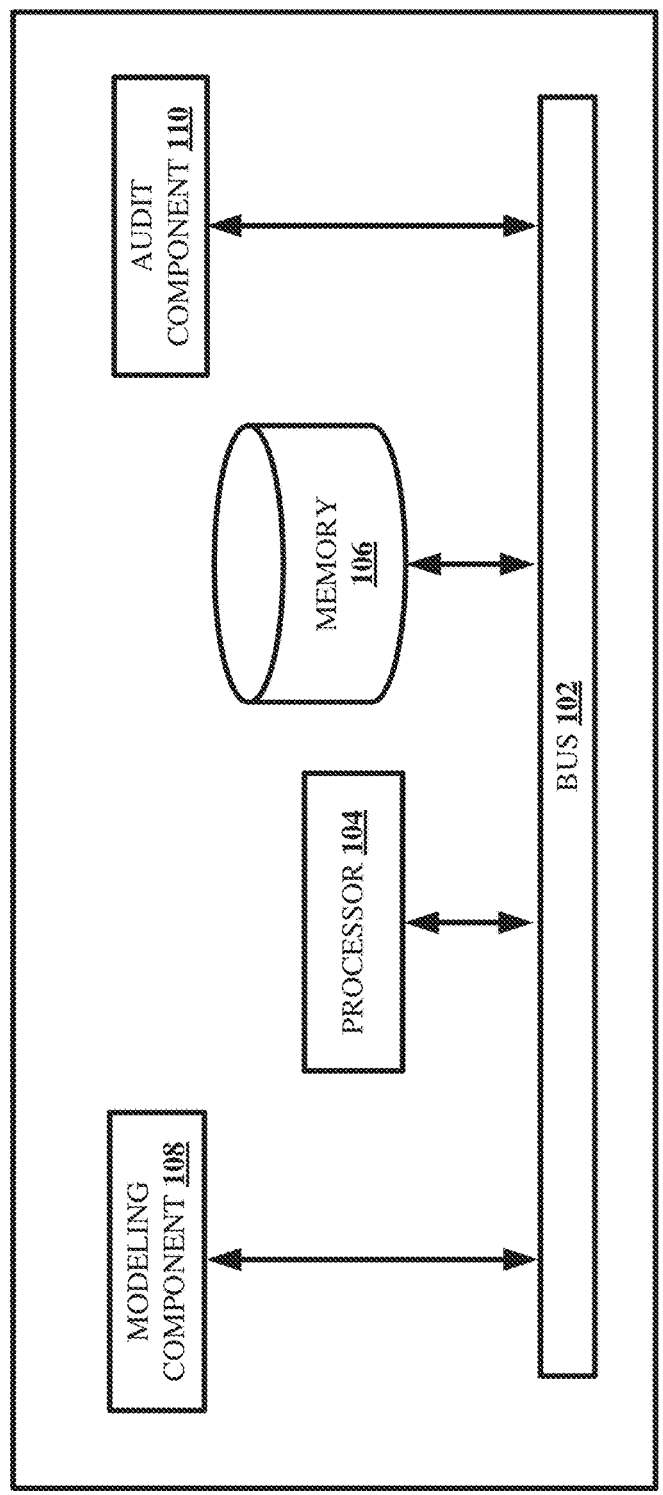
FIG. 1 illustrates a block diagram of an example, non-limiting system facilitating protecting data security in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Data protection is the key for enterprise security, but application programming interfaces (APIs) often expose unauthorized data due to programming mistakes and misuse of data models. For example, the search query often includes foreign key (e.g., field in a table that refers to a primary key in another table) so that all customer data return instead of a specific customer. Data security in a multi-tenancy environment is especially critical as all customer data is stored in the same database. Multi-tenancy can provide additional data security risks if a representational state transfer application programming interface (REST API) returns customer properties but does not filter with customer identification (ID). An active resource model can have many similar issues. Schema or table level authorization can resolve the data access problem for granular authorization. In this case, the table or schema can be segregated, however, that can be a burden. The user interface can manipulate the parameters sent to the server. This can be properly authorized, otherwise the data can be breached.

One or more embodiments described herein can facilitate semantic data security monitoring by employing hierarchical authorization analysis on data exchanges such as REST APIs. It is appreciated that as used herein, the REST API is an example embodiment and an alternative API can be utilized. User or API authorization can be translated into data authorization. Some embodiments described herein can facilitate fine-grained authorization data security monitoring with audit capabilities. The level of authorization monitoring can be at the data level, rather than at the schema level (e.g., where database provides). Various embodiments described herein can facilitate out-of-box (e.g., feature or functionality that can work immediately after or without configuration or modification) data security monitoring independent of programming languages or running systems.

Customer data can be protected more securely by passing the customer data through secure connectors. As technology progress to more container run applications requiring interconnects between various applications, a need in increasing connector security can be seen. Additionally, different combinations of application requiring interface continue to grow at rapid rates, so self-learning of connector security can be of importance because without self-learning, timely connections can be difficult to maintain.

Some embodiments described herein can monitor and protect data security for data exchanges among micro-services. The off-line learning can use REST API descriptions and documents that can describe authorization, roles, etc., and history of users exercising these APIs. Various embodiments described herein can employ latent Dirichlet allocation (LDA) to transform REST API and roles into feature vectors and use these vectors to create a model specifying patterns for authorization of APIs for the roles. The on-line process can use this model to determine if a data request is authorized by establishing similarity between current (e.g., real-time) role request for data through APIs and known authorized patterns. Continuous learning of the model specifying patterns for authorization can facilitate data protection, fine-grained information protection and audit, and dynamic control (e.g., of access to the data).

Data structure can be decomposed into a tree format. Data can be analyzed with the user-provided authorization policy. Data semantic can be employed to properly protect data security. The correlation between the data semantics and data schema can be considered as protection for the data security. A hierarchical authorization analysis can be performed from bottom to top. A modified latent semantic analysis can be used to analyze relations between a set of data and a set of roles related to the data. One or more embodiments described herein can facilitate active learning of the authorization policy changes and patterns in operations. This can include monitoring and capturing real-time data as well as allowing users the ability to provide feedback for further analysis.

For example, service mesh running as micro-services can communicate via REST APIs. Protecting data security can comprise monitoring and auditing data exchanges among micro-services (e.g., cognitive modules requiring data protection). An out-of-box data protection system can monitor the data security and alert developers or operators to resolve security issues.

The subject disclosure is directed to computer processing systems, computer-implemented methods, apparatus and/or computer program products that facilitate efficiently and automatically (e.g., without direct human involvement) protecting data security. Humans are also unable to perform the embodiments described herein as they include, and are not limited to, performing, e.g., complex Markov processes, Bayesian analysis, or other artificial intelligence-based techniques based on probabilistic analyses and evaluating electronic information indicative of protecting data security, and/or determining whether countless multitudes of probability values assigned to protecting data security exceed or fall below various defined probability values.

The computer processing systems, computer-implemented methods, apparatus and/or computer program products employ hardware and/or software to solve problems that are highly technical in nature. For example, problems are related to automated processing, determining or inferring data security. These problems are not abstract and cannot be performed as a set of mental acts by a human. For example, a human, or even thousands of humans, cannot efficiently, accurately and effectively manually apply countless or thousands of data and perform analysis to determine data security.

To aid in the numerous inferences described herein (e.g., inferring data security), components described herein can examine the entirety or a subset of data to which it is granted access and can provide for reasoning about or inferring states of a system, environment, etc., from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in construction of new events or actions from a set of observed events and/or stored event data, whether the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIG. 1 illustrates a block diagram of an example, non-limiting system 100 facilitating protecting data security in accordance with one or more embodiments described herein. Aspects of systems (e.g., non-limiting system 100 and the like), apparatuses or processes explained in this disclosure can constitute machine-executable components embodied within machines, e.g., embodied in one or more computer readable mediums (or media) associated with one or more machines. Such components, when executed by the one or more machines, e.g., computers, computing devices, virtual machines, etc., can cause the machines to perform the operations described.

In various embodiments, the system 100 can be any type of component, machine, device, facility, apparatus, and/or instrument that comprises a processor. In some embodiments, the system 100 is capable of effective and/or operative communication with a wired and/or wireless network. Components, machines, apparatuses, devices, facilities, and/or instrumentalities that can comprise the system 100 can include, but are not limited to, tablet computing devices, handheld devices, server class computing machines and/or databases, laptop computers, notebook computers, desktop computers, cell phones, smart phones, consumer appliances and/or instrumentation, industrial and/or commercial devices, digital assistants, multimedia Internet enabled phones, multimedia players, and the like.

As illustrated in FIG. 1, the system 100 can comprise a bus 102, processor 104, memory 106, modeling component 108 and/or audit component 110. The bus 102 can provide for interconnection of various components of the system 100. The processor 104 and memory 106 can carry out computation and/or storage operations of the system 100 as described herein. It is to be appreciated that in some embodiments one or more system components can communicate wirelessly with other components, through a direct wired connection or integrated on a chipset.

The system 100 can be an out-of-box data security monitoring system that can work independent of programming languages and executing systems. For example, service mesh running as micro-services can communicate via REST APIs. The system 100 can protect the data exchanges between the micro-services so that unauthorized data is not exposed. The system 100 can monitor or audit the REST APIs to verify that proper data protection is in place and alert developers or operators to resolve detected issues.

In various embodiments, the modeling component 108 can generate a model by extracting properties of data transmitted from executing an application to learn repeated patterns. The modeling component 108 can correlate between data semantic and data schematic of the data transmitted from executing the application to provide further data security protection. The modeling component 108 can employ machine learning, and more specifically, the modeling component 108 can employ LDA to analyze the corpus being called to detect for hidden topics. The modeling component 108 can decompose the data structure into a tree format to facilitate mapping of the roles or authorization to the data for data analysis. The data analysis can be performed with user-provided authorization policy. As authorization policies change, new models or rules can be generated through continuous learning by analyzing historical data to determine changes in patterns.

The modeling component 108 can transform the data format (e.g., JavaScript Object Notation or JSON) into a tree format and apply LDA to find the roles. Latent Dirichlet allocation can be employed to perform authorization extraction, which can extract hidden topic (e.g., role or authorization). Latent Dirichlet allocation can be a generative probabilistic model of a document corpus (e.g., REST API). Documents can be represented as random mixtures over latent topics, where individual topics can be characterized by a distribution over words. Latent Dirichlet allocation can be used for feature extraction from issue or ticket creation by representing a REST API as a document by concatenating the attributes. Historical APIs can be used for training LDA models. The trained LDA models for the REST APIs can be used to infer feature vectors. The trained LDA models can also be used for extracting features from user documents (e.g., manual, roles, authorization, etc.). Similarity measures between data (e.g., API) and role (e.g. authorization) classes can be established. Role-data mapping can be defined based on the role classes and data for the application. Similarity measures between data and role classes and role-data mapping are the two criteria that can govern topic modeling to find authorization. Priority can be established for new monitoring for data classes based on role-data mapping and similarity.

The audit component 110 can perform a fine-grained hierarchical authorization analysis or audit with LDA by comparing the data with the model. The audit component 110 can perform the fine-grained authorization audit based on monitoring the data at the data level, rather than at the schematic level. At the schematic level, customer data can be kept in one table requiring authorization of the table as a whole, which can be cumbersome. At the data level, a customer data can be authorized without authorizing other customer data not needing authorization. Authorization at the data level can provide protection for customers based on the requested data rather than based on the table where the data is stored. Data level authorization can be especially critical in a multi-tenancy environment as numerous customer data can be stored in the same database.

Figure 2:
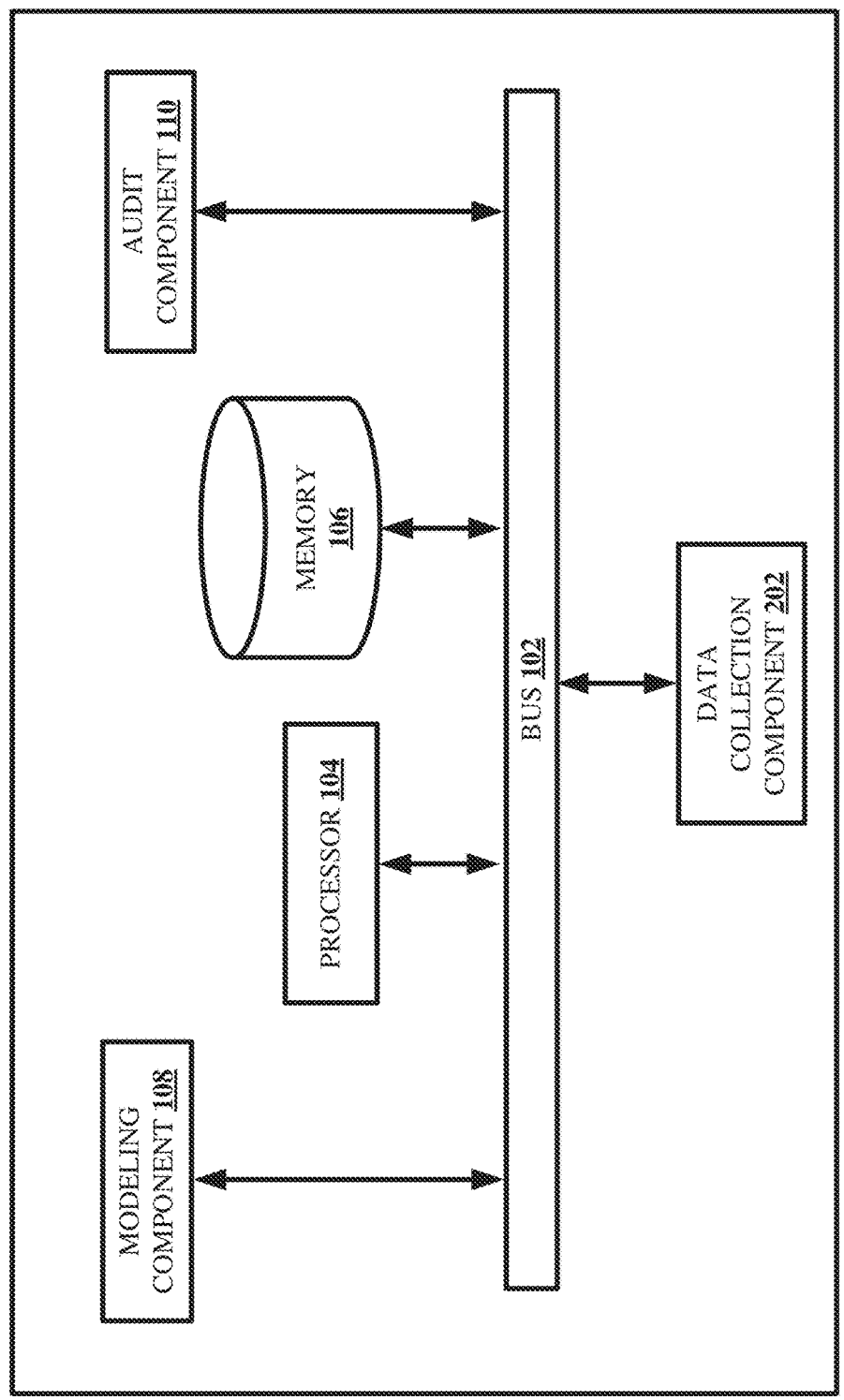
FIG. 2 illustrates a block diagram of an example, non-limiting system facilitating protecting data security including a data collection component in accordance with one or more embodiments described herein.

FIG. 2 illustrates a block diagram of an example, non-limiting system 100 facilitating protecting data security including a data collection component 202 in accordance with one or more embodiments described herein. Repetitive description of like elements employed in other embodiments described herein is omitted for sake of brevity. An executing application can communicate with other applications through APIs such as REST APIs, which can be in various formats such as adjacent format or extended format. Applications can communicate through queries and answers that can expose unauthorized data. Data providing answers to queries can be retrieved from the database, however, sometimes these data are not authorized for the caller.

The data collection component 202 can collect the data transmitted from executing the application with a REST API to be monitored and audited for verification that proper data protection is in place. The collected data can be audited with a fine-grained authorization analysis by the audit component 110 by comparing the collected data with the model generated by the modeling component 108. The fine-grained authorization audit can be based on analyzing the collected data at the data level so that an authorization determination can be made for the requested data and not for other data on the same schematic level (e.g., data in the same table or location).

Figure 3:
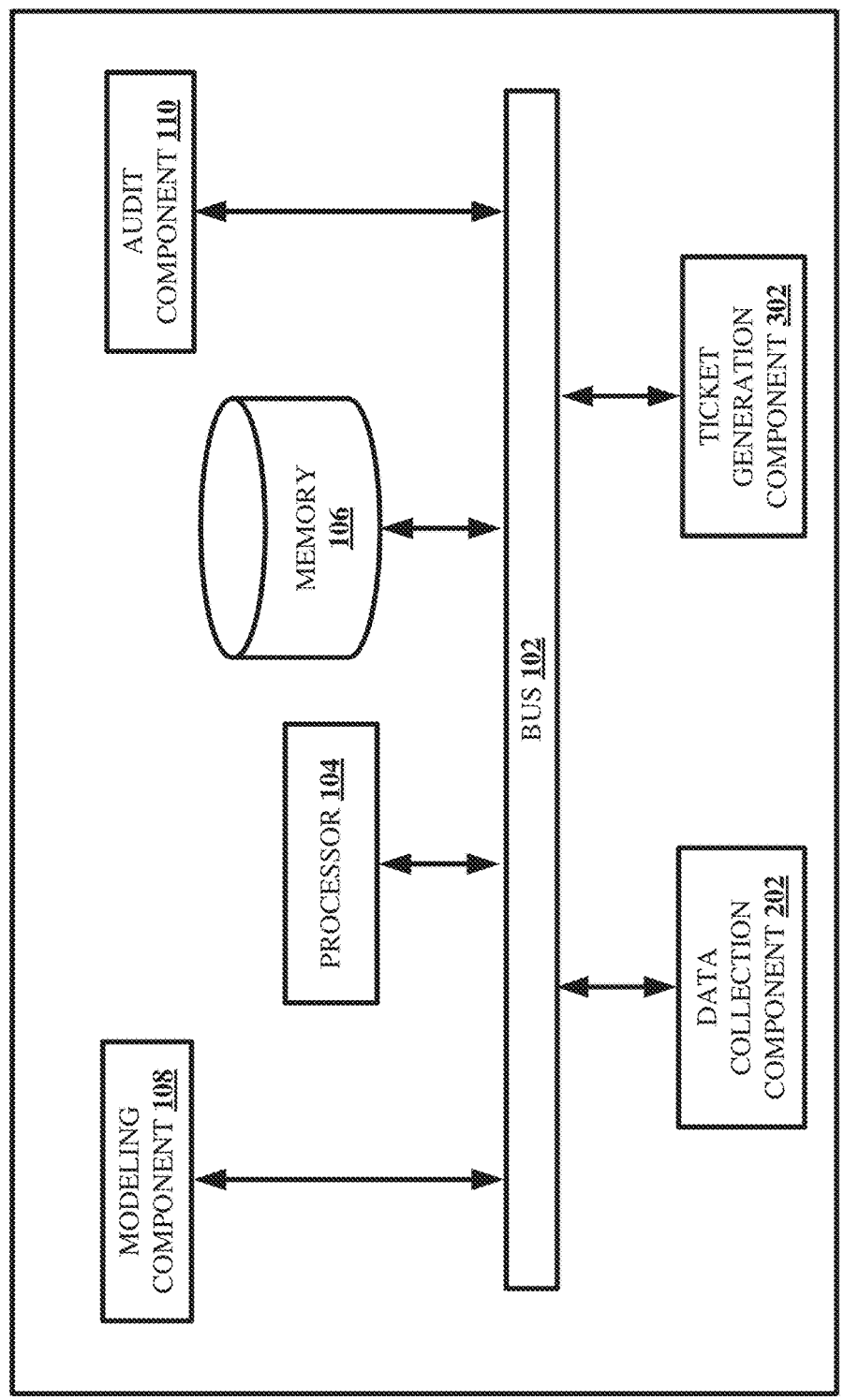
FIG. 3 illustrates a block diagram of an example, non-limiting system facilitating protecting data security including a ticket generation component in accordance with one or more embodiments described herein.

FIG. 3 illustrates a block diagram of an example, non-limiting system 100 facilitating protecting data security including a ticket generation component 302 in accordance with one or more embodiments described herein. Repetitive description of like elements employed in other embodiments described herein is omitted for sake of brevity. The ticket generation component 302 can generate a ticket to resolve an unauthorized issue if the fine-grained authorization audit determines (e.g., via the audit component 110) that the data is not authorized by a role.

If the audit component 110 detects that the requested data is not authorized by a role, the ticket generation component 302 can create a ticket (e.g., incident notification) to notify the developers or operators or someone who can resolve the issue. For example, if someone is trying to access data that is not authorized, the audit component 110 can detect the unauthorized request and the ticket generation component 302 can create a ticket to notify the developers or operators to resolve this issue. The developers or operators can block the person making the unauthorized request to resolve the issue.

Figure 4:
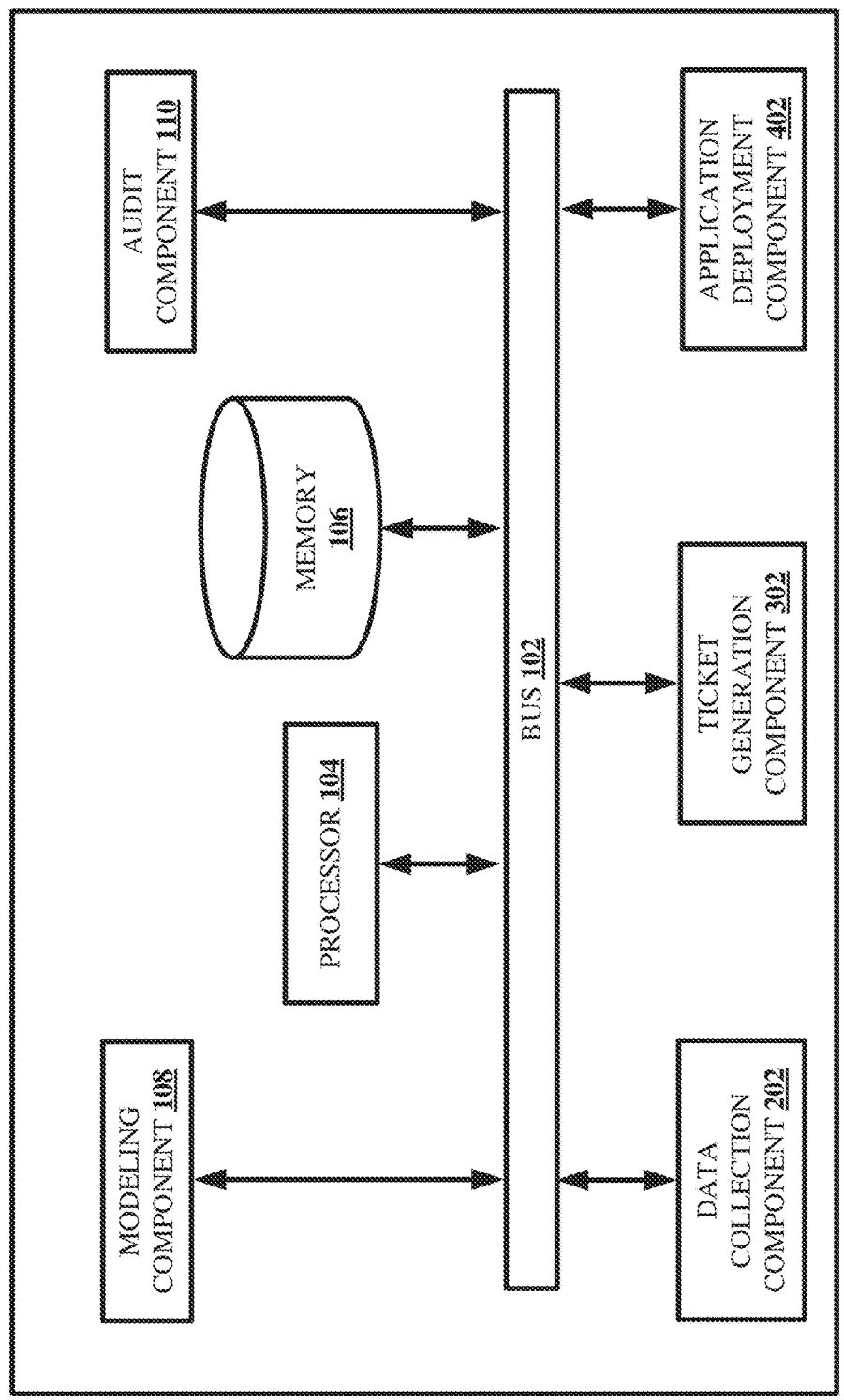
FIG. 4 illustrates a block diagram of an example, non-limiting system facilitating protecting data security including an application deployment component in accordance with one or more embodiments described herein.

FIG. 4 illustrates a block diagram of an example, non-limiting system 100 facilitating protecting data security including an application deployment component 402 in accordance with one or more embodiments described herein. Repetitive description of like elements employed in other embodiments described herein is omitted for sake of brevity. The application deployment component 402 can deploy an application with REST APIs. However, the application deployment component 402 can also stop the application from executing if an unauthorized issue is detected by the audit component 110. The application deployment component 402 can stop the application from executing until the unauthorized issue is fixed. Upon verification by the fine-grained authorization audit that the unauthorized issue is fixed, the application deployment component 402 can deploy the application again.

Figure 5:
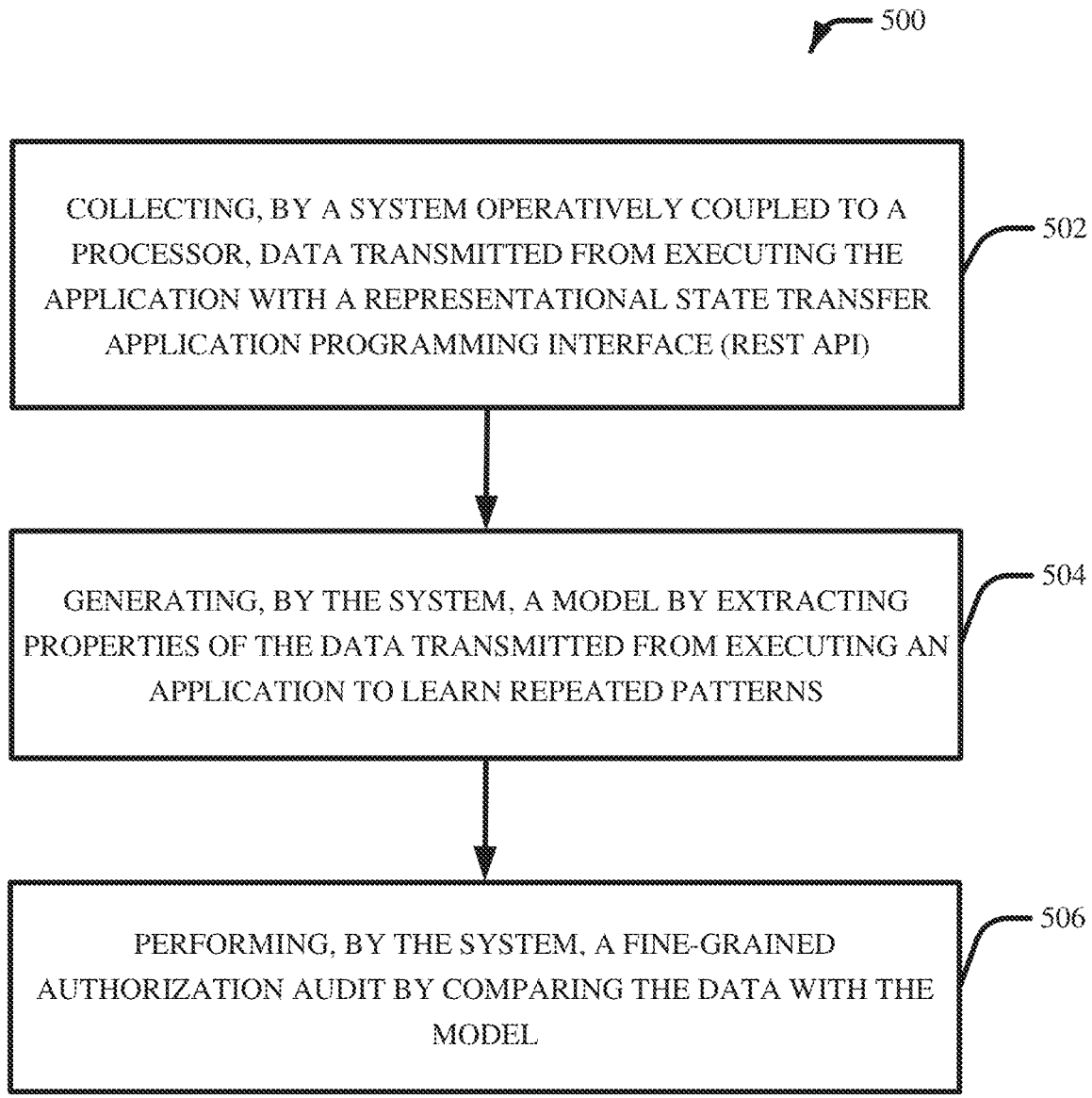
FIGS. 5-7 illustrate flow diagrams of example, non-limiting computer-implemented methods facilitating protecting data security in accordance with one or more embodiments described herein.

FIG. 5 illustrates a flow diagram of an example, non-limiting computer-implemented method 500 facilitating protecting data security in accordance with one or more embodiments described herein. Repetitive description of like elements employed in other embodiments described herein is omitted for sake of brevity. At 502, the computer-implemented method 500 can comprise collecting (e.g., via the data collection component 202), by the system 100 operatively coupled to the processor 104, data transmitted from executing the application with a representational state transfer application programming interface (REST API). At 504, the computer-implemented method 500 can comprise generating (e.g., via the modeling component 108), by the system 100, a model by extracting properties of the data transmitted from executing an application to learn repeated patterns. At 506, the computer-implemented method 500 can comprise performing (e.g., via the audit component 110), by the system 100, a fine-grained authorization audit by comparing the data with the model.

Figure 6:
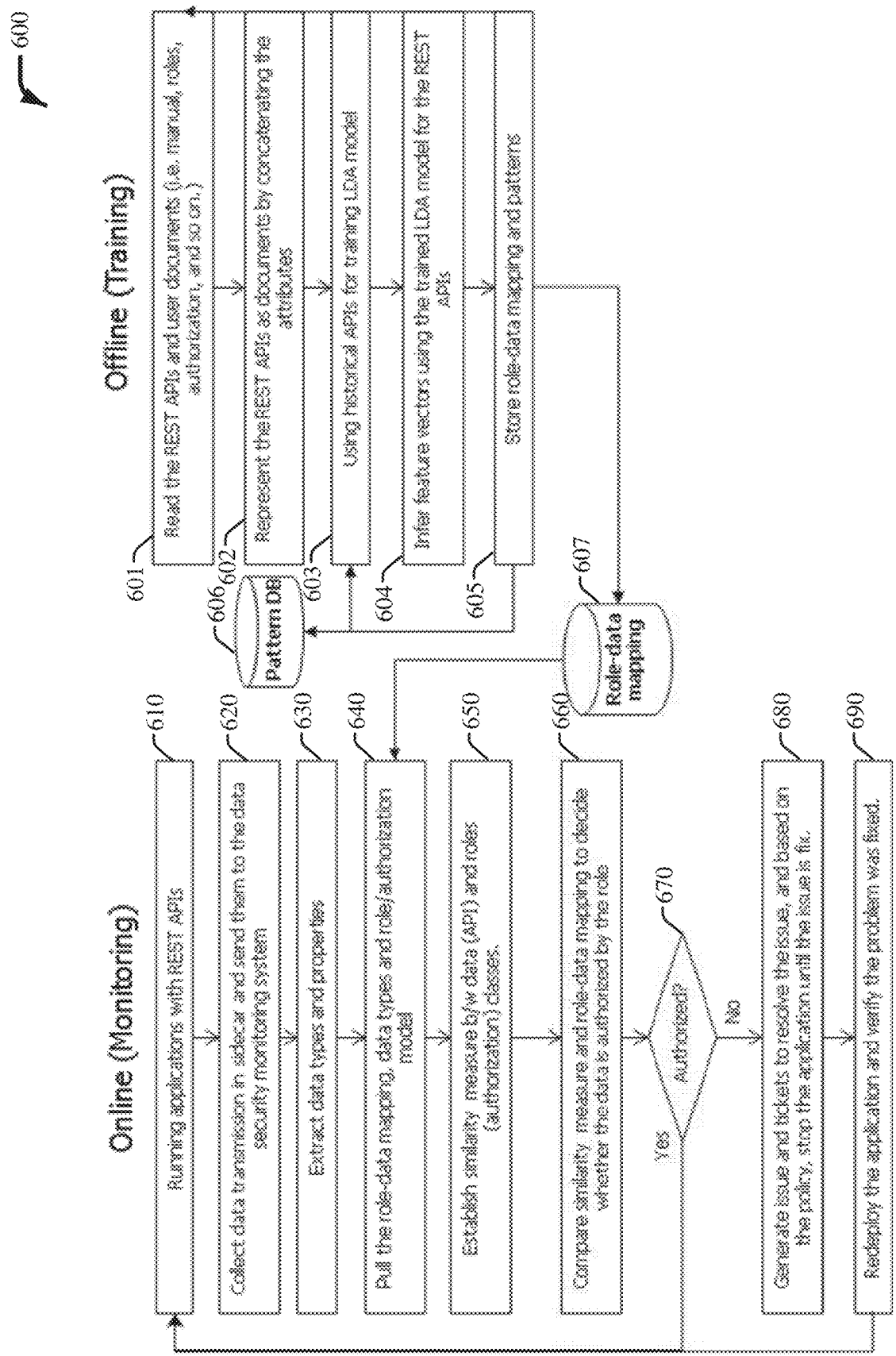

FIG. 6 illustrates a flow diagram of an example, non-limiting computer-implemented method 600 facilitating protecting data security in accordance with one or more embodiments described herein. Repetitive description of like elements employed in other embodiments described herein is omitted for sake of brevity. For the online monitoring, at 610, the computer-implemented method 600 can comprise executing or running (e.g., via the application deployment component 402) applications with REST APIs. At 620, the computer-implemented method 600 can comprise collecting (e.g., via the data collection component 202) data transmission in sidecar and sending (e.g., via the data collection component 202) them to the data security monitoring system (e.g., modeling component 108, audit component 110, etc.). At 630, the computer-implemented method 600 can comprise extracting (e.g., via the modeling component 108) data types and properties. At 640, the computer-implemented method 600 can comprise pulling (e.g., via the audit component 110) the role-data mapping, data types and role or authorization model. At 650, the computer-implemented method 600 can comprise establishing (e.g., via the audit component 110) similarity measure between data (e.g., API) and roles (e.g., authorization) classes. At 660, the computer-implemented method 600 can comprise comparing (e.g., via the audit component 110) similarity measure and role-data mapping to decide or determine whether the data is authorized by the role. At 670, the computer-implemented method 600 can comprise determining (e.g., via the audit component 110) whether the applications are authorized. If yes, the process continues at 610. If no, the process proceeds to 680. At 680, the computer-implemented method 600 can comprise generating (e.g., via the ticket generation component 302) issue and tickets to resolve the issue, and based on the policy, stop the application until the issue is fixed. At 690, the computer-implemented method 600 can comprise redeploying (e.g., via the application deployment component 402) the application and verifying the problem (e.g., issue) was fixed.

For the offline training, at 601, the computer-implemented method 600 can comprise reading (e.g., via the data collection component 202) the REST APIs and user documents (e.g., manual, roles, authorization, and so on). At 602, the computer-implemented method 600 can comprise representing (e.g., via the modeling component 108) the REST APIs as documents by concatenating the attributes. At 603, the computer-implemented method 600 can comprise using (e.g., via the modeling component 108) historical APIs for training LDA model. At 604, the computer-implemented method 600 can comprise inferring (e.g., via the modeling component 108) feature vectors using the trained LDA model for the REST APIs. At 605, the computer-implemented method 600 can comprise storing (e.g., via the data collection component 202) role-data mapping and patterns.

The role-data mapping can be stored into role-data mapping database 606. The role-data mapping database 606 can be employed at 640 (e.g., pulling the role-data mapping, data types and role or authorization model). The patterns can be stored into pattern database 607. The pattern database 607 can be employed at 603 (e.g., using historical APIs for training LDA model).

Figure 7:
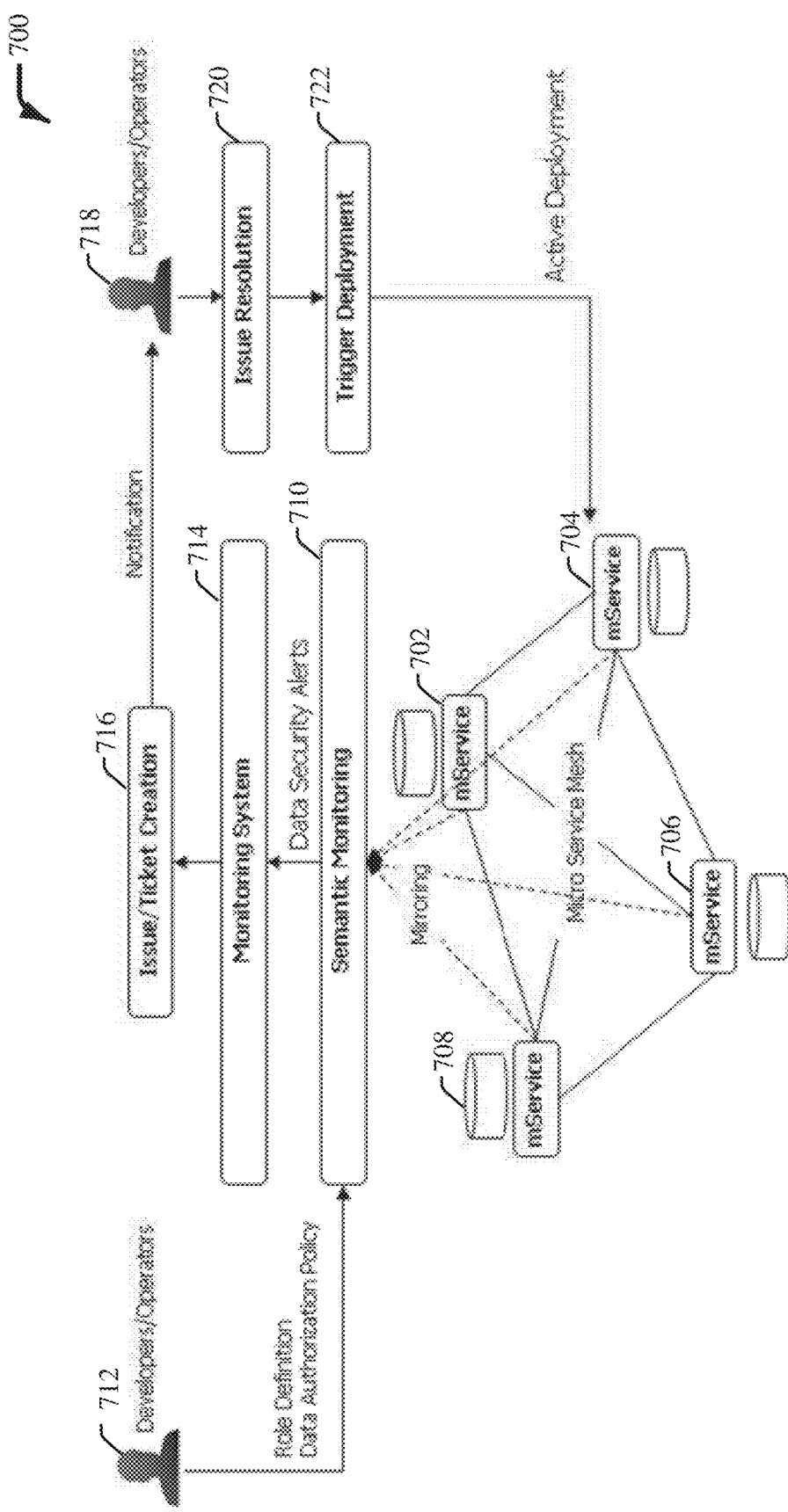

FIG. 7 illustrates a flow diagram of an example, non-limiting computer-implemented method 700 facilitating protecting data security in accordance with one or more embodiments described herein. Repetitive description of like elements employed in other embodiments described herein is omitted for sake of brevity. Micro-service 702, micro-service 704, micro-service 706 and micro-service 708 together can form a micro-service mesh. The semantic monitoring 710 (e.g., modeling component 108, audit component 110) can mirror micro-services 702, 704, 706 and 708. The monitoring system 714 (e.g., ticket generation component 302) can receive data security alerts. The issue or ticket creation 716 (e.g., ticket generation component 302) can send a notification to developers or operators 718 to solve the issue and generate issue resolution 720, which can trigger deployment 722 (e.g., via the application deployment component 402) to reinitiate active deployment. Developers or operators 712 can feed role definition and data authorization policy into the semantic monitoring 710 (e.g., modeling component 108, audit component 110).

Figure 8:
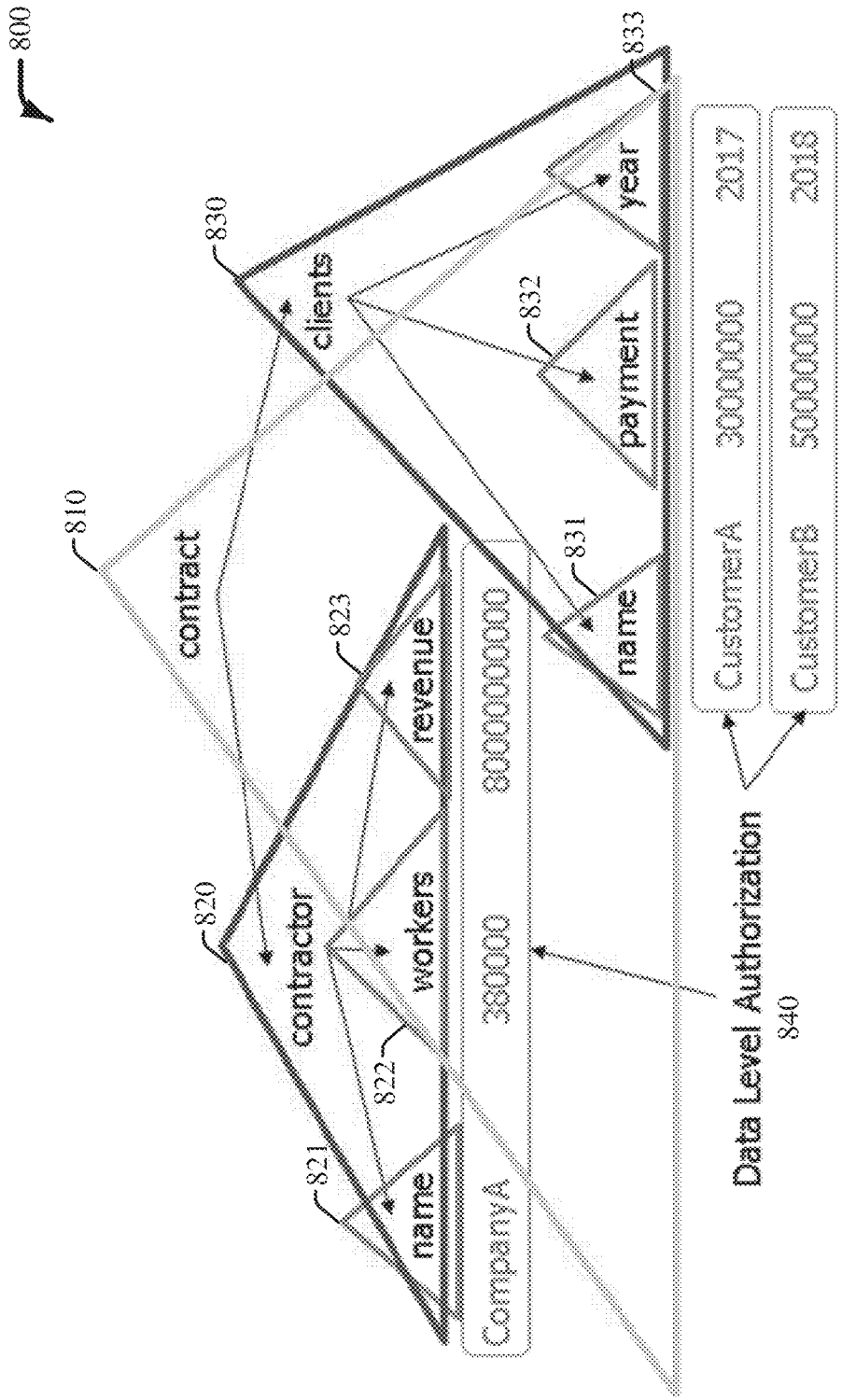
FIG. 8 illustrates a block diagram of an example, non-limiting data tree facilitating protecting data security in accordance with one or more embodiments described herein.

FIG. 8 illustrates a block diagram of an example, non-limiting data tree 800 facilitating protecting data security in accordance with one or more embodiments described herein. Repetitive description of like elements employed in other embodiments described herein is omitted for sake of brevity. Data format (e.g., JavaScript Object Notation or JSON) can be transformed into a tree format as illustrated in FIG. 8 of data tree 800. Latent Dirichlet allocation (LDA) can be applied to find the roles. FIG. 8 illustrates a hierarchical authorization analysis with LDA. The data tree 800 can comprise the contract 810, which can comprise the contractor 820 and the clients 830. The contractor 820 can comprise name 821 (e.g., company name or CompanyA), workers 822 (e.g., number of workers or 380000) and revenue 823 (e.g., 80000000000). The clients 830 can comprise name 831 (e.g., name of clients or CustomerA and CustomerB), payment (e.g., 30000000 and 50000000) and year 833 (e.g., 2017 and 2018). Data level authorization 840 can be at the data level rather than at the schema level. Examples of the data level for the contractor 820 can be CompanyA with 380000 workers and 80000000000 in revenue. Examples of the data level for the clients 830 can be CustomerA with 30000000 payment in year 2017 and CustomerB with 50000000 payment in year 2018.

FIG. 9 illustrates an example, non-limiting active learning algorithm 900 facilitating protecting data security in accordance with one or more embodiments described herein. Repetitive description of like elements employed in other embodiments described herein is omitted for sake of brevity. Example, non-limiting active learning algorithm 900 can be a multi-label SVM-based active learning algorithm for authorization patterns. The inputs can be labeled set set $D_l$, unlabeled set $D_u$, number of steps T, number of examples per iteration S. Train a multi-label SVM classifier f based on training data $D_l$ for each instance x in $D_u$. Predict its label vector y using the LR (loss reduction)-based prediction method. $D^*_s = \text{argmax}_{D_s}(\Sigma_{X \in D_s} \Sigma_{i=1}((1-y^i f_i(x))/2))$ constrained to $y^i \epsilon\{-1, 1\}$ (e.g., equation for Maximum loss reduction with maximal confidence). Calculate the expected loss reduction with the most confident label vector y, score $(x) = \Sigma^k_{i=1}((1-y^i f_i(x))/2)$. Sort score(x) in decreasing order for all x in $D_u$. Select a set of S examples $D^*_s$ with the largest scores (or experienced SME input), and update the training set $D_l \leftarrow D_l + D^*_s$. $f_i(x)$ is a SVM classifier associated with class i. $x_1 \ldots x_n$ data points (e.g. feature vector for each x–[roles, access types, data types, data, etc.]).

Figure 10:
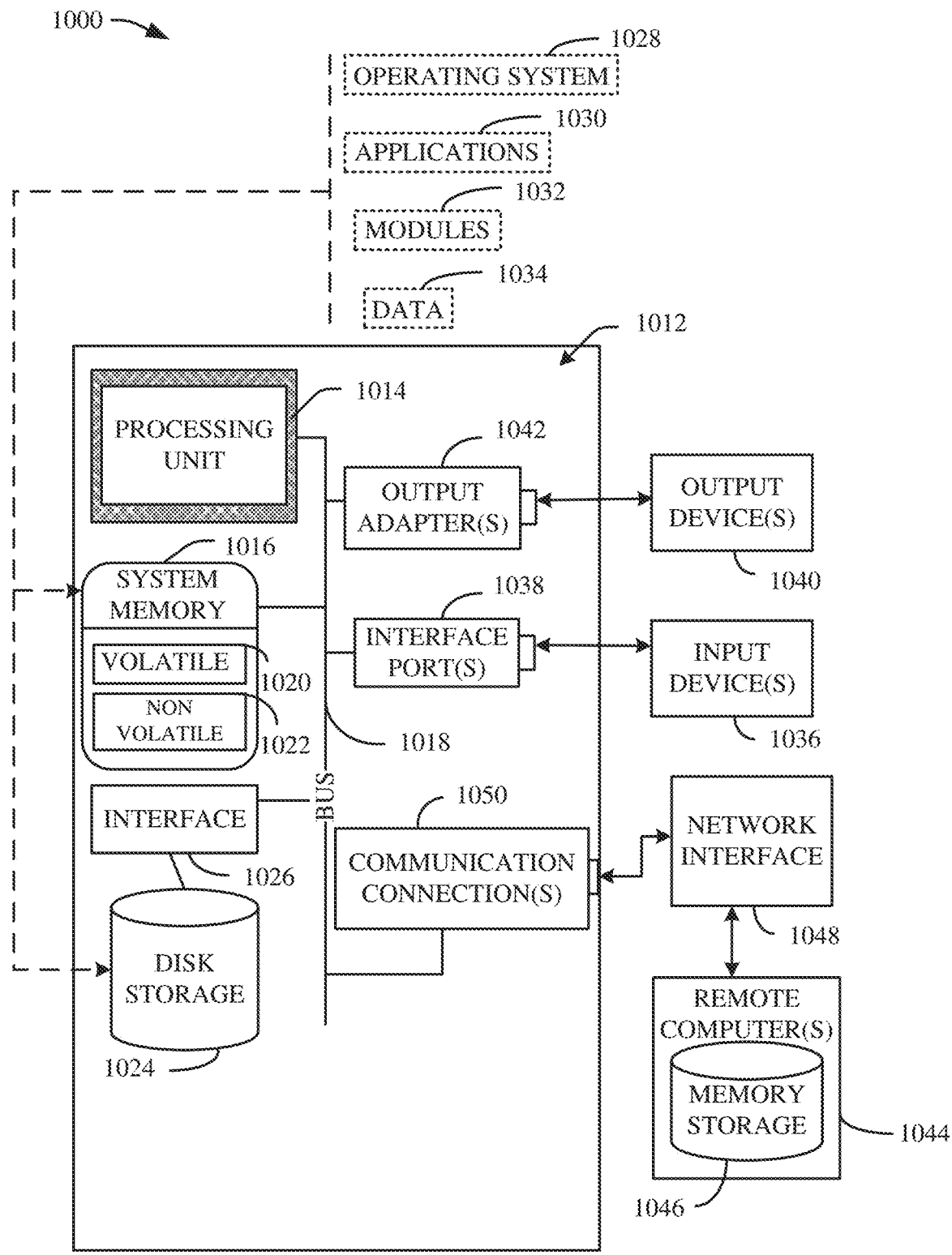
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
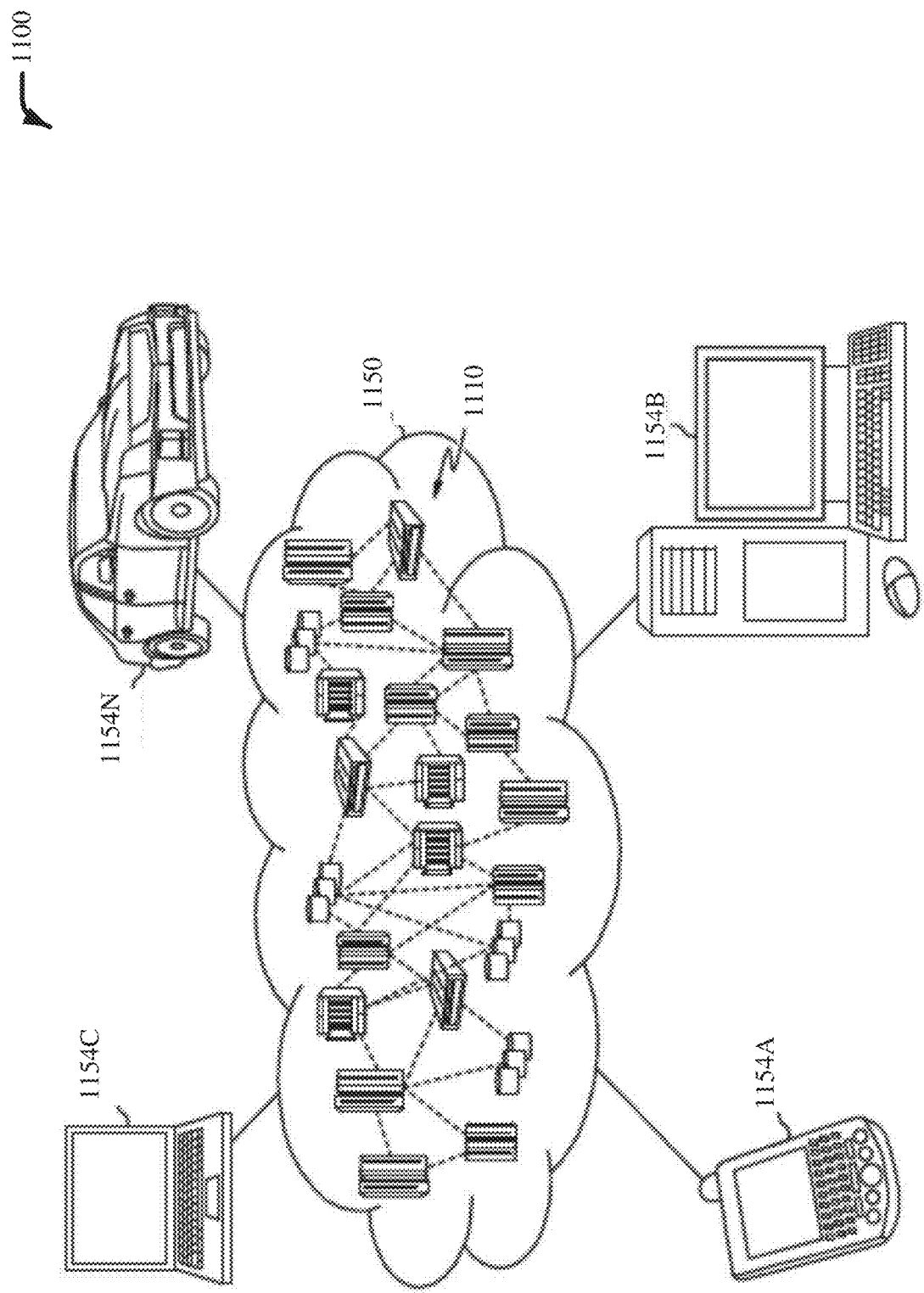
FIG. 11 illustrates a block diagram of an example, non-limiting cloud computing environment in accordance with one or more embodiments described herein.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
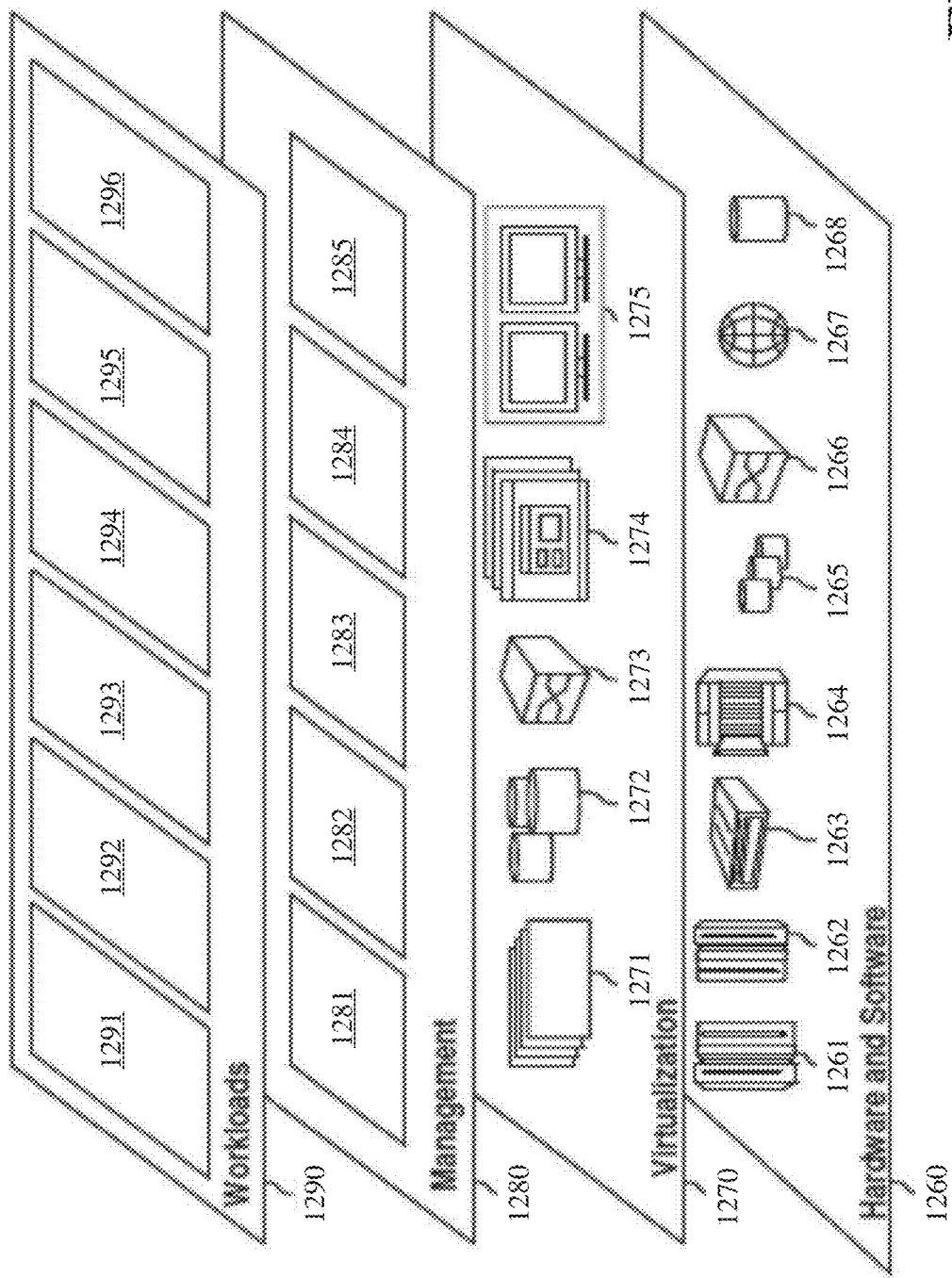
FIG. 12 illustrates a block diagram of example, non-limiting abstraction model layers in accordance with one or more embodiments described herein.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and mobile desktop 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor, operably coupled to the memory, and that executes the computer executable components stored in the memory, wherein the computer executable components comprise:
a data collection component that extracts properties of data transmitted from executing an application using at least one representational state transfer application programming interface (REST API) of REST APIs;
a modeling component that, in response to the execution of the application using the REST API:
generates a model comprising mappings between roles and data access authorizations by determining patterns of relationships between the roles and the data access authorizations based on analyzing one or more documents describing the REST APIs, the roles, the data access authorizations, and historical execution of the REST APIs by applications associated with users,
correlates between data semantic and data schematic of the data with respect to data security protection; and
an audit component that:
performs a fine-grained authorization audit by comparing the data with the mappings of the model based on a role associated with the application, and
in response to a result of the fine-grained authorization audit indicating that at least a portion of the data is associated with an unauthorized data access, initiates an action to mitigate the application from conducting another unauthorized data access.

2. The system of claim 1, wherein the system is a data security monitoring system independent of programming languages and executing systems.

3. The system of claim 1, wherein the action comprises generation of an alert regarding the unauthorized data access.

4. The system of claim 1, wherein the modeling component employs machine learning, and wherein the machine learning comprises latent Dirichlet allocation (LDA).

5. The system of claim 1, wherein the application is a micro-service that is part of a service mesh.

6. The system of claim 1, wherein the audit component performs the fine-grained authorization audit based on monitoring the data at a data level.

7. The system of claim 1, wherein the action comprises generation of a ticket to resolve the unauthorized data access.

8. The system of claim 7, wherein the action comprises stop the application from executing until the unauthorized data access is fixed.

9. The system of claim 8, wherein the action further comprises start execution of the application upon verification that the unauthorized data access is fixed.

10. A computer-implemented method, comprising:
extracting, by a system operatively coupled to a processor, properties of data transmitted from executing an application using at least one representational state transfer application programming interface (REST API) of REST APIs;
in response to the execution the application using the REST API:
generating, by the system, a model comprising mappings between roles and data access authorizations by determining patterns of relationships between the roles and the data access authorizations based on analyzing one or more documents describing the REST APIs, the roles, the data access authorizations, and historical execution of the REST APIs by applications associated with users, and correlating, by the system, between data semantic and data schematic of the data with respect to data security protection;

performing, by the system, a fine-grained authorization audit by comparing the data with the mappings of the model based on a role associated with the application; and in response to a result of the fine-grained authorization audit indicating that at least a portion of the data is associated with an unauthorized data access, performing, by the system, an action to mitigate the application from conducting another unauthorized data access.

11. The computer-implemented method of claim 10, wherein the system is a data security monitoring system independent of programming languages and executing systems.

12. The computer-implemented method of claim 10, further comprising collecting, by the system, the data transmitted from executing the application.

13. The computer-implemented method of claim 10, wherein the generating the model comprises employing, by the system, machine learning, and wherein the machine learning comprises latent Dirichlet allocation (LDA).

14. The computer-implemented method of claim 10, wherein the application is a micro-service that is part of a service mesh.

15. The computer-implemented method of claim 10, wherein the performing the fine-grained authorization audit comprises monitoring, by the system, the data at a data level.

16. A computer program product for facilitating protecting data security, the computer program product comprising a non-transitory computer readable medium having program instructions embodied therewith, the program instructions executable by a processor to cause the processor to:

extract properties of data transmitted from executing an application using at least one representational state transfer application programming interface (REST API) of REST APIs;

in response to the execution the application using the REST API:

generate a model comprising mappings between roles and data access authorizations by determining patterns of relationships between the roles and the data access authorizations based on analyzing one or more documents describing the REST APIs, the roles, the data access authorizations, and historical execution of the REST APIs by applications associated with users, and correlate between data semantic and data schematic of the data with respect to data security protection;

perform a fine-grained authorization audit by comparing the data with the mappings of the model based on a role associated with the application; and in response to a result of the fine-grained authorization audit indicating that at least a portion of the data is associated with an unauthorized data access, execute an action to mitigate the application from conducting another unauthorized data access.

17. The computer program product of claim 16, wherein the program instructions are further executable to cause the processor to:

collect the data transmitted from executing the application.

18. The computer program product of claim 16, wherein the program instructions are further executable to cause the processor to:

employ machine learning to generate the model, and wherein the machine learning comprises latent Dirichlet allocation (LDA).

19. The computer program product of claim 16, wherein the application is a micro-service that is part of a service mesh.

20. The computer program product of claim 16, wherein the program instructions are further executable to cause the processor to:

perform the fine-grained authorization audit based on monitoring the data at a data level.

* * * * *